United States Patent Office 2,738,238
Patented Mar. 13, 1956

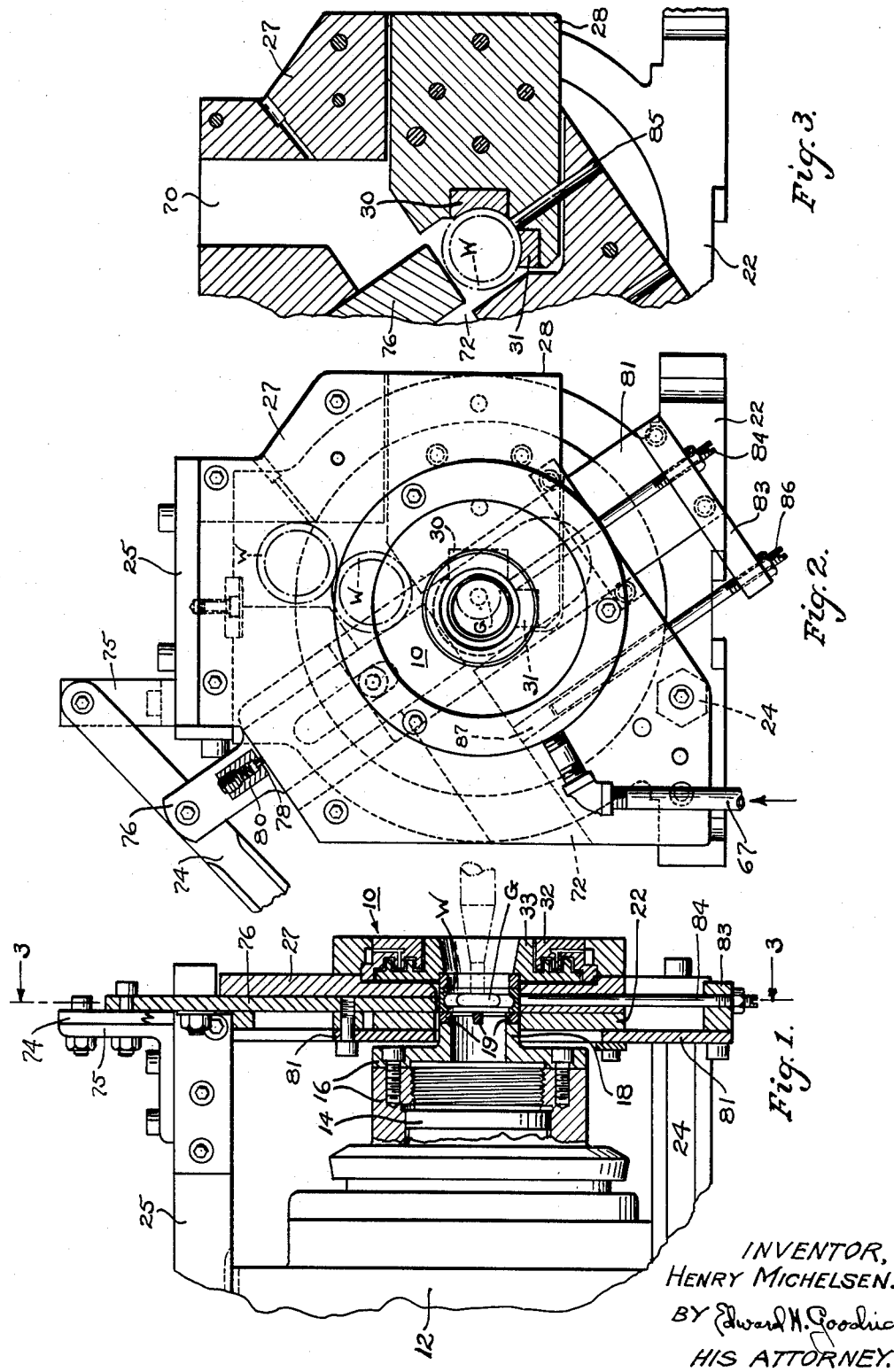

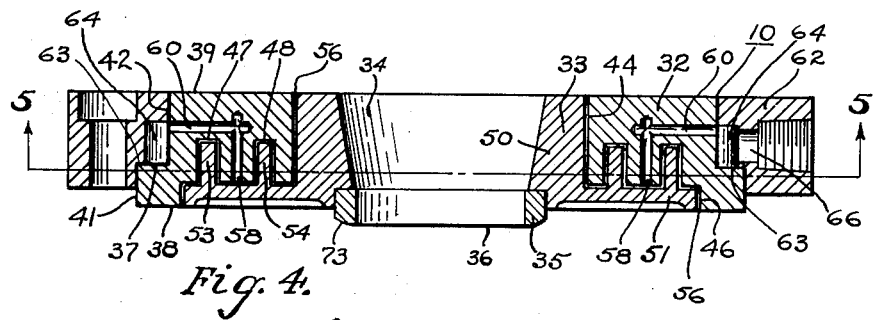
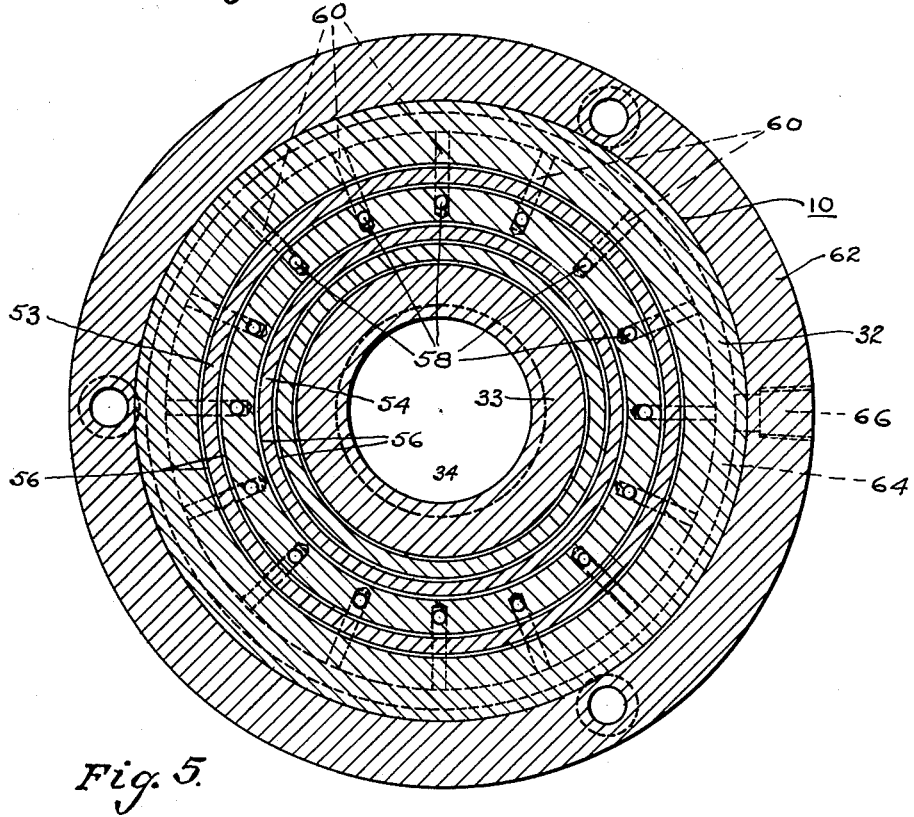

2,738,238

BEARINGS

Henry Michelsen, Bristol, Conn., assignor to General Motors Corporation, Detroit, Mich., a corporation of Delaware Application June 27, 1952, Serial No. 295,951

1 Claim. (Cl. 308—9)

This invention relates to bearings and particularly to radial and thrust type bearings having relatively rotatable members that are spaced from each other and lubricated by an intervening film of gas under pressure.

It has been common practice to lubricate bearings by employing between the relative sliding surfaces of the bearing a film of lubricant such as oil or grease which is intended to prevent metal to metal contact thereby reducing friction and wear. The starting friction of an oil or grease lubricated bearing may be high since during a non-operating period of the bearing the lubricant often drains away from the load carrying surfaces and/or breaks down between these surfaces leaving them in metal to metal contact. In all grease or oil lubricated bearings, there is considerable friction present during bearing operation due to the friction within this grease or oil occasioned by the extruding of this lubricant between the relatively sliding or relatively rotating bearing members, this friction within the lubricant being principally dependent upon the viscosity of the lubricant.

An object of this invention is to provide an improved bearing which is substantially free from friction and wear and wherein the relatively rotatable parts of the bearing are lubricated by and held from contact with each other by an intervening film of compressed gas.

Another object is to provide an improved radial and thrust type of antifriction bearing having relatively rotatable parts separated from each other by a layer of compressed gas which supports the components of radial and axial thrust of the bearing.

A further object is to provide a combined radial and end thrust bearing of improved construction having rotatable parts out of engagement with each other and wherein the thrust components within the bearing may be adjusted to cushion the load to which the bearing is subjected.

To these ends and also to improve generally upon devices of this character, this invention consists in the various matters hereinafter described and claimed. In its broader aspects, the invention is not necessarily limited to the specific structures selected for illustrative purposes wherein Figure 1 is a fragmentary side elevation partly in section and showing my improved bearing holding a work piece in a grinding machine.

Figure 2 is an end elevation of the parts shown in Figure 1.

Figure 3 is a fragmentary vertical sectional view taken along the line 3—3 of Figure 1.

Figure 4 is an enlarged diametrical cross sectional view through my improved bearing.

Figure 5 is a cross sectional view through my bearing and taken along the line 5—5 of Figure 4.

My improved bearing 10, which is useful for many purposes, is particularly adaptable as a combined radial and thrust bearing for holding a work piece W, as the outer race ring of an antifriction bearing in a grinding machine for the grinding of an inner raceway by a grinding wheel G supported on a spindle rotated at a suitable speed. A work driving head 12, mounted on a machine base, not illustrated, rotatably supports a power driven spindle 14 provided with a threaded end which demountably receives a face plate 16 having a sleeve extension 18 coaxial with the spindle. Secured to and extending from the forward end of the sleeve extension 18 are a series of peripherally spaced blocks 19 composed of hard wear resistant material such as tungsten carbide, the flat front faces of these blocks lying in a common plane normal to the axis of rotation of the spindle 14.

A vertically disposed flat plate 22, surrounding the sleeve extension 18 in spaced relation and rigidly supported by members 24 and 25 secured to the work driving head 12, has secured to its outer face a secondary plate 27 that surrounds the work piece W in spaced relation. This secondary plate is also slotted to receive a work guide 28 fastened to the plate 22. Secured to and projecting from the work guide 28 are upper and lower work-supporting shoes 30, 31 which preferably have arcuate surfaces in which the work piece W peripherally seats, these arcuate surfaces being preferably located so that the work piece is supported with its axis in a predetermined location which is below and forwardly of the axis of rotation of the face plate 26 whereby rotation of face plate blocks 19 in contact with an end face of the work piece W will urge the work piece into seated relation against the work-supporting shoes 30, 31 during work rotation. The upper shoe 30 is preferably positioned rearwardly of the work to back up the work during grinding, the weight of the work piece being principally supported by the lower shoe 31. These work supporting shoes may be composed of a suitable hard wear-resistant material such as tungsten carbide against which the work may slidably rotate with a minimum of friction and wear.

The bearing 10 has an outer non-rotatable ring 32 and an inner rotatable ring 33 provided with an axial bore 34 which is preferably tapered and through which the grinding wheel and spindle may extend in clearance relation to the ring 33. Pressed into a counterbore in the forward end of this inner ring is a thrust ring 35 of suitable hard wear resistant material such as tungsten carbide, this ring 35 being provided with a flat end face 36 for pressure engagement with the work piece W. The outer ring 32 has a stepped periphery wherein an intermediate annular shoulder 37, substantially parallel to flat front and rear walls 38, 39 extends radially inwardly from a cylindrical periphery 41 to a cylindrical periphery 42 of smaller diameter. An axial bore 44 extends through the outer ring 32 into a coaxial counterbore 46 extending inwardly from the front wall 38, this counterbore having a radially disposed flat bottom wall from which axially projects radially spaced annular grooves 47 and 48 each of which has a pair of uniformly spaced cylindrical walls coaxial with the central bore 44.

The rotatable inner ring 33 has a cylindrical hub 50 of slightly smaller diameter than that of the bore 44, and an annular flange 51 extending radially outwardly from this hub lies in slight clearance relation within the counterbore 46, this flange having a cylindrical periphery of slightly less diameter than that of the counterbore 46. Axially projecting from the flange 51 is a pair of radially spaced annular flanges or fins 53 and 54 corresponding to and received respectively in the annular grooves 47 and 48, the cylindrical walls of these fins being normally in slightly spaced relation to the corresponding adjacent groove walls. This closely spaced interfitting of the rotatable ring 33 within the non-rotatable ring 32 provides an annular labyrinthian path 56 which for clarity is shown exaggerated in size. A series of peripherally spaced passages 58 open at their outer ends into the counterbore 46 intermediate its radial width, preferably between the grooves 47 and 48, and at their inner ends these passages respectively connect with generally radial passages 60 which open through the outer wall 42. The bearing 10, which is preferably located coaxially of the work piece W at start of grinding, has its outer ring 32 piloted in a counterbore in the secondary plate 27 and is demountably clamped in position by a retaining ring 62 detachably fastened to the secondary plate 27. The outer ring portion 41 is pressed into a counterbore of this retaining ring against a shoulder 63 and the cylindrical outer ring wall 42 closely fits within a bore of this retaining ring. A retaining ring counterbore in cooperation with the outer ring wall 42 forms an annular distribution chamber 64 which communicates with a supply passage 66 and with the open-ended passages 60.

Gas such as air under a controlled pressure is directed from a suitable source through piping 67 into the distribution chamber 64 and thence through the passages 60 and 58. This compressed gas in escaping from the passages 58 will fill the labyrinthian passages 56 and flow radially outwardly between the flange 51 and the bottom of the counterbore 46 thence radially outwardly around the annular fin 53 and finally forwardly out around the periphery of the flange 51. At the same time, compressed gas from the passages 58 will flow radially inwardly between the flange 51 and the bottom of the counterbore 46 and radially inwardly around the annular fin 54 and finally rearwardly out of the bearing around the hub 50. The flow of this gas under pressure in opposite directions through the labyrinth 56 radially supports the inner ring 33 out of contact with the ring 32 on a cushion of compressed gas between the relatively rotatable rings 32 and 33. Furthermore, the force of the compressed gas between the bottom of the counterbore 46 and the adjacent opposed flat faces of the flange 51 as well as the gas pressure against the ends of the annular fins 53, 54 at the bottoms of the grooves 47 and 48, will thrust the rotatable ring 33 axially away from the non-rotatable ring 32 thereby exerting sufficient thrust of the ring 35 against the work piece W to hold it in rotatably driven engagement with the face plate blocks 19 while the work piece is supported by the shoes 30, 31. This axial pressure of the work piece W against the work-driving face plate blocks 19 may be easily and quickly controlled by regulating the gas pressure fed into the piping 67. Also, this compressed gas support for the inner rotatable ring 33 allows for any misalignment of the rings 32 and 33 and assures that the thrust ring 35 will be held in flat engagement with the end of the work piece W. Due to the smooth interface engagement of the work piece ends with the blocks 19 and with the thrust ring 35 and due to the below center location of the work piece with respect to the driving spindle axis, there will be sufficient sliding action of the work piece so that it will remain seated against the shoes 30 and 31 during grinding.

The work pieces W are successively entered into and ejected from grinding position by a feeding mechanism. Work pieces W in superposed relation roll down a feeding slot 70 in the secondary plate 27 and after grinding are ejected through an inclined discharge slot 72 in this plate. During loading and unloading of a work piece with respect to grinding position, the gas pressure entering the bearing is shut off to remove the thrust of the ring 35 against the work piece. Also, the edge of the thrust ring 35 is bevelled at 73 to help the work piece enter into grinding position. A manually controlled lever 74, pivotally mounted on a supporting bracket 75, shifts a feeding plunger 76 across the slot 72 towards and from work grinding position. A spring pressed plunger 78 mounted in a lug 80 on the plunger 76 engages the plate 27 and supports the plunger 76 out of contact with the work piece being ground. A shuttle 81, secured to the plunger 76 in spaced relation and movable therewith, carries at its lower end a block 83 in which is adjustably mounted an ejector rod 84 longitudinally movable through a bore 85 into work piece engagement. A stop rod 86, slidable in a bore 87 and movable endwise into and out of the discharge slot 72, is also adjustably mounted in the block 83. At the completion of a grinding operation after the grinding wheel has been withdrawn from the work piece, the lever 74 is lifted and as the plunger 76 is pulled upwardly, the rods 84 and 86 move upwardly. The rod 84 forces the ground work piece upwardly and into the inclined discharge slot 72 and the rod 86, now projecting into the slot 72, holds the ground work piece in the slot 72 just beyond the plunger 76. As the ground work piece enters the slot 72, the next work piece to be ground enters beneath the plunger 76 against the rod 84. The operator now moves the lever 74 downwardly and the rod 84 lowers this next work piece into seated engagement on the shoes 30, 31 while the plunger 76 prevents advance of the succeeding work piece in the slot 70. At the same time, the withdrawal of the rod 86 from the discharge slot 72 releases the previously ground work piece which now rolls on down the discharge slot to a suitable bin.

I claim:

In a device of the character indicated, a non-rotatable bearing member having a through bore and a coaxial counterbore, annular grooves axially extending from the counterbore, a rotatable bearing member within the non-rotatable member, a hub on the rotatable member disposed within said bore and having an outer diameter slightly less than the inner diameter of the bore so as to form therewith an annular chamber communicating at one end with the atmosphere, a flange radially extending outwardly from the hub and located in the counterbore in closely spaced relation to the walls of said counterbore, annular fins laterally projecting from the flange and axially extending into the annular grooves, the fins being of less radial thickness than the width of the grooves, the interfitting relation of the flange and fins with the non-rotatable member providing between the bearing members an annularly extending labyrinth having radially spaced open outer and inner ends, the inner end of said labyrinth communicating with the other end of said annular chamber, said non-rotatable member having a series of circumferentially spaced axially extending passages opening into the labyrinth between a pair of said annular fins, said non-rotatable member also having a plurality of radially extending passages each communicating at one end with an axially extending passage, a retaining member peripherally fitted over the non-rotatable member and providing an annular fluid supply distribution chamber surrounding the non-rotatable member, said radially extending passages each communicating at the other end with said distribution chamber, and means for supplying fluid under pressure to said distribution chamber, whereby the rotatable bearing member is radially and axially supported by fluid under pressure in spaced relation with respect to said non-rotatable bearing member.

References Cited in the file of this patent

UNITED STATES PATENTS

| | | |
|---|---|---|
| 775,923 | Holmes | Nov. 29, 1904 |
| 1,337,742 | Abbott | Apr. 20, 1920 |
| 2,481,695 | Scott | Sept. 13, 1949 |
| 2,603,539 | Brewster | July 15, 1952 |
| 2,605,147 | Raichle et al. | July 29, 1952 |